US010239386B2

(12) United States Patent
De Paoli et al.

(10) Patent No.: US 10,239,386 B2
(45) Date of Patent: Mar. 26, 2019

(54) LAMINATED GLAZING COMPRISING PROFILED CLIP IN BEADING

(71) Applicant: SAINT-GOBAIN GLASS FRANCE, Courbevoie (FR)

(72) Inventors: Martial De Paoli, Cuts (FR); Laurent Lamoureux, Ribecourt-dreslincourt (FR); Emmanuelle Artzner, Antony (FR); Laurent Silvestrini, Bussy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/548,833

(22) PCT Filed: Feb. 5, 2016

(86) PCT No.: PCT/FR2016/050247
§ 371 (c)(1),
(2) Date: Aug. 4, 2017

(87) PCT Pub. No.: WO2016/124868
PCT Pub. Date: Aug. 11, 2016

(65) Prior Publication Data
US 2018/0029450 A1 Feb. 1, 2018

(30) Foreign Application Priority Data

Feb. 5, 2015 (FR) .................................. 15 50890

(51) Int. Cl.
*B60J 1/00* (2006.01)
*B32B 17/10* (2006.01)
(Continued)

(52) U.S. Cl.
CPC ......... *B60J 1/008* (2013.01); *B32B 17/10036* (2013.01); *B32B 17/10293* (2013.01);
(Continued)

(58) Field of Classification Search
CPC ........ B32B 17/10036; B32B 17/10293; B32B 2605/006; B60J 1/008; B60J 1/02
(Continued)

(56) References Cited

U.S. PATENT DOCUMENTS 2,401,552 A * 6/1946 Cox .................. B32B 17/10036
156/106
2,408,483 A * 10/1946 Rodman ........... B32B 17/10036
156/101
(Continued)

FOREIGN PATENT DOCUMENTS

DE          36 06 566 A1    9/1987
DE    20 2008 006 986 U1   10/2009
(Continued)

OTHER PUBLICATIONS

International Search Report as issued in International Patent Application No. PCT/FR2016/050247, dated Apr. 13, 2016.

*Primary Examiner* — Patrick J Maestri
*Assistant Examiner* — Joseph J. Sadlon
(74) *Attorney, Agent, or Firm* — Pillsbury Winthrop Shaw Pittman LLP

(57) ABSTRACT

A glazing and notably a vehicle glazing, includes a laminated glazed element including an outside sheet of glass, an inside sheet of glass and an interlayer sheet of plastic situated between the two sheets of glass, wherein the profiled beading includes, when viewed in cross section, an interlayer flange situated between the interlayer face of the outside sheet of glass and the interlayer face of the inside sheet of glass.

31 Claims, 8 Drawing Sheets

(51) Int. Cl.
*B60J 1/02* (2006.01)
*B60J 10/70* (2016.01)
*B60J 10/30* (2016.01)
*B60J 10/27* (2016.01)
*B60J 10/18* (2016.01)
*B60J 10/16* (2016.01)

(52) U.S. Cl.
CPC ................. *B60J 1/001* (2013.01); *B60J 1/02* (2013.01); *B60J 10/16* (2016.02); *B60J 10/18* (2016.02); *B60J 10/27* (2016.02); *B60J 10/30* (2016.02); *B60J 10/70* (2016.02); *B32B 2605/006* (2013.01)

(58) Field of Classification Search
USPC ....................................................... 52/204.71
See application file for complete search history.

(56) References Cited

U.S. PATENT DOCUMENTS

| | | | | |
|---|---|---|---|---|
| 2,537,804 A * | 1/1951 | Watkins | ................. | B29C 39/10 109/76 |
| 2,572,947 A * | 10/1951 | Pevney | ............. | B32B 17/10036 156/101 |
| 3,248,273 A * | 4/1966 | Boicey | ............. | B32B 17/10174 428/140 |
| 3,679,527 A * | 7/1972 | Crick | ................ | B32B 17/10018 428/101 |
| 3,764,445 A * | 10/1973 | Olson | ............... | B32B 17/10018 428/188 |
| 5,650,872 A * | 7/1997 | Saxe | ................. | B32B 17/10036 359/296 |
| 5,885,714 A * | 3/1999 | Demeester | ........ | B32B 17/10045 428/441 |
| 6,565,980 B1 * | 5/2003 | Ackermann | ...... | B32B 17/10009 428/425.6 |
| 7,064,882 B2 * | 6/2006 | Tonar | ...................... | B32B 17/06 359/265 |
| 7,806,455 B2 * | 10/2010 | Polke | ....................... | B60J 10/18 296/93 |
| 8,628,137 B2 * | 1/2014 | Platt | ....................... | B60J 10/265 296/93 |
| 9,259,994 B2 * | 2/2016 | Erner | ......................... | B60J 1/02 |
| 9,757,933 B2 * | 9/2017 | Patti | ................... | B32B 17/10036 |

FOREIGN PATENT DOCUMENTS

| | | |
|---|---|---|
| EP | 0 945 296 A1 | 9/1999 |
| WO | WO 01/45974 A1 | 6/2001 |
| WO | WO 2006/002891 A2 | 1/2006 |
| WO | WO 2013/127977 A1 | 9/2013 |

\* cited by examiner

LAMINATED GLAZING COMPRISING PROFILED CLIP IN BEADING

CROSS-REFERENCE TO RELATED APPLICATIONS

This application is the U.S. National Stage of PCT/FR2016/050247, filed Feb. 5, 2016, which in turn claims priority to French patent application number 1550890 filed Feb. 5, 2015. The content of these applications are incorporated herein by reference in their entireties.

The present invention relates to a glazing and notably a vehicle glazing, comprising a laminated glazed element comprising an outside sheet of glass, an inside sheet of glass and an interlayer sheet of plastic situated between said two sheets of glass.

Like with any laminated glazed element:
the outside sheet of glass has an outside face, an edge face and an interlayer face which is oriented toward the interlayer sheet of plastic,
the inside sheet of glass has an interlayer face which is oriented toward the interlayer sheet of plastic, an edge face and an inside face.

The glazing according to the invention comprises along at least part of at least one edge a profiled beading comprising a groove for clip-fastening a cover piece onto said profiled beading, said cover piece comprising, viewed in cross section, a barbed hook that enters said groove at the time of clip-fastening.

Indeed it is known practice, in order to position and/or fasten a cover piece to a glazed element, to use grooved profiled beading such as this.

This profiled beading is generally fixed to the inside face of the glazed element using an inside flange which is bonded against this inside face.

For good adhesion of this inside flange to the glazed element to allow forcible clip-fastening into the groove, this inside flange needs to be relatively wide (when the profiled beading is observed in cross section, as is the case in most documents of the prior art).

The prior art recognizes two types of situation:
when the cover piece covers at least the groove protruding over the top of the outside face of the glazed element, as for example in patent applications EP 945 296 and DE 3606566; and
when the cover piece covers at least the groove without protruding over the top of the outside face of the glazed element, as in patent applications WO 2001/045974 and WO 2001/85481 for example.

In the first situation, the cover piece needs to be wide enough to cover at least the inside flange so that it will not be visible from the outside and/or a masking strip is created further on the outside than the inside flange.

In the second situation, a masking strip is created further on the outside than the inside flange to cover at least the inside flange so that it will not be visible from the outside.

What these two situations have in common is that the cover piece and/or the masking strip are, themselves or together, at least as wide as the inside flange and, in general, wider than the inside flange; as a result, the field of view through the glazed element is diminished.

Furthermore, because of the presence of the inside flange at the corner between the edge face of the inside sheet of glass and the inside face thereof, the bead of adhesive used to bond the glazing to the adjacent bodywork needs to be positioned further toward the center of the glazing; now, this bead of adhesive likewise needs to be hidden from the outside.

Hence it is common practice to consider that, along the edge of glazing equipped with a grooved profiled beading, it is a strip 30 to 35 mm wide that cannot be used to allow light to enter, thus diminishing the field of view.

It is an object of the present invention to overcome these disadvantages by proposing glazing, comprising profiled beading that allows forcible clip-fastening, and which is therefore firmly attached to the glazed element, while at the same time making it possible to increase the field of view through the glazed element.

The present invention thus relates to glazing, notably vehicle glazing, according to claim 1. This glazing comprises a laminated glazed element comprising an outside sheet of glass, an inside sheet of glass and an interlayer sheet of plastic situated between said two sheets of glass (directly in contact or with the interposition of another sheet of plastic),
said outside sheet of glass having an outside face, an edge face and an interlayer face which is oriented toward said interlayer sheet of plastic,
said inside sheet of glass having an interlayer face which is oriented toward said interlayer sheet of plastic, an edge face and an inside face,
said glazing comprising along at least part of at least one edge a profiled beading comprising a groove for clip-fastening a cover piece onto said profiled beading, said cover piece comprising, viewed in cross section, a barbed hook that enters said groove at the time of clip-fastening.

This glazing is notable in that said profiled beading comprises, when viewed in cross section, an interlayer flange situated between said interlayer face of said outside sheet of glass and said interlayer face of said inside sheet of glass.

The expression "an interlayer flange situated between said interlayer face of said outside sheet of glass and said interlayer face of said inside sheet of glass" is to be understood as meaning that the interlayer flange extends across the transverse width thereof between said interlayer face of said outside sheet of glass and said interlayer face of said inside sheet of glass.

Said interlayer flange is in direct or indirect contact (in which latter case via an adhesive substance) with said interlayer face of said outside sheet of glass and is in direct or indirect contact (in which latter case via an adhesive substance) with said interlayer face of said inside sheet of glass.

Very surprisingly, it was thus discovered that it was possible to attach a grooved profiled beading to a laminated glazed element using a space left between the outside sheet of glass and the inside sheet of glass of this laminated glazed element and that the groove could then be used to achieve reliable clip-fastening, namely in which the insertion of a barbed hook into the groove did not destroy this connection between the profiled beading and the laminated glazed element.

The space left between the outside sheet of glass and the inside sheet of glass is preferably created by using an interlayer sheet of plastic which, along at least the edge of the glazed element equipped with the profiled beading, has an edge face that is set back with respect to the edge faces of the sheets of glass which are themselves plum with one another.

The cohesion of the laminated glazed element is thus greater than the damage likely to be inflicted by the clip-fastening of a barbed hook into the groove of such a profiled beading with an interlayer flange interposed between the outside sheet of glass and the inside sheet of glass of a laminated glazed element.

For the sake of the mechanical reliability of the clip-fastening, it is preferable for said interlayer flange to have a width comprised between 2.0 and 10.0 mm, or even comprised between 2.0 and 6.0 mm, or even comprised between 3.0 and 5.0 mm. This width corresponds to the width of the interlayer flange which extends between said interlayer faces of the sheets of glass, namely from the edge face of the sheets of glass and in the centripetal direction.

The presence of the interlayer flange makes it possible to dispense with the use of an inside flange, or of an outside flange, or of both; at the very least, it makes it possible to reduce the width of such an inside flange and/or outside flange and makes it possible to reduce the width of the masking along the edge of the glazing.

In an independent alternative form, said interlayer flange may be formed as an integral part of said groove and preferably comprises a flat tenon which is on the inside of the interlayer flange and that comes into contact neither with said interlayer face of said outside sheet of glass nor with said interlayer face of said inside sheet of glass.

In an alternative form independent of the preceding one, said interlayer flange is made of a corrugated tenon, said corrugated tenon preferably extending into the material of which said groove is made. For preference, this corrugated tenon comes into contact with said interlayer face of said outside sheet of glass and with said interlayer face of said inside sheet of glass.

In an alternative form independent of the preceding ones, said interlayer flange does not come into contact with said edge face of said interlayer sheet of plastic, so that the internal tension at the time of clip-fastening does not damage the lamination.

In an alternative form independent of the preceding ones, said profiled beading is situated against said edge face of said outside sheet of glass.

In an alternative form independent of the preceding ones, said profiled beading is situated against said edge face of said inside sheet of glass.

In an alternative form independent of the preceding ones, said profiled beading is situated along two lateral edges of said glazed element and/or along an upper edge of said glazed element. In another independent alternative form, said profiled beading is situated only along a lower edge of said glazed element.

In an alternative form independent of the preceding ones, said groove is situated facing the edge face of said outside sheet of glass and/or facing the edge face of said inside sheet of glass.

Said interlayer flange preferably has a thickness equal to the thickness between said outside sheet of glass and said inside sheet of glass and, in particular, equal to the thickness of said interlayer sheet of plastic and notably equal to 0.76 mm. For preference, the interlayer flange is thus simply held between the interlayer face of the outside sheet of glass and the interlayer face of the inside sheet of glass by wedging, preferably without using any adhesive substance between the interlayer flange and the interlayer sheet; however, it is possible for the space between the interlayer flange and the edge face of the interlayer sheet to be filled with an adhesive substance such as adhesive.

In this alternative form, said interlayer flange is in contact on the one hand with said interlayer face of said outside sheet of glass and on the other hand with said interlayer face of said inside sheet of glass.

In an alternative form that is an alternative to the preceding one, said interlayer flange has a thickness less than the thickness between said outside sheet of glass and said inside sheet of glass.

In this alternative form, said interlayer flange is not in direct contact with said interlayer face of said outside sheet of glass and/or is not in direct contact with said interlayer face of said inside sheet of glass: an adhesive substance, such as a bead of adhesive, may be situated between said interlayer flange and said interlayer face of said outside sheet of glass and/or between said interlayer flange and said interlayer face of said inside sheet of glass.

In one particular embodiment, said groove is situated above said outside face of said outside sheet of glass; said groove is then preferably formed as an integral part of an outside flange.

In a very specific alternative form, said profiled beading has, in cross section, the shape of an m rotated through 90°, with a first cavity of the m to accommodate the barbed hook of said cover piece and a second cavity of the m to straddle said outside sheet of glass.

Said profiled beading may comprise, when viewed in cross section, an outside flange situated above (directly on or indirectly on and with the insertion of an adhesive strip formed by a layer of adhesive or an adhesive tape) said outside face of said outside sheet of glass.

Said profiled beading may moreover comprise, when viewed in cross section, an inside flange situated below (directly under or indirectly under and with the insertion of an adhesive strip formed by a layer of adhesive or an adhesive tape) said inside face of said inside sheet of glass.

In both the latter instances, said outside flange and/or said inside flange preferably comprises:
- a hinge portion made of a flexible polymer material, such as TPE for example, preferably having a width comprised between 0.5 and 2.0 mm, or
- a narrowing of section, preferably having a thickness of the order of half the thickness of said outside flange and/or of said inside flange which bears it, this being over a width comprised preferably between 0.5 and 2.0 mm.

These two elements allow the flange to be raised up off the face of the adjacent sheet of glass so as to make it easier for the profiled beading to be positioned and attached.

For preference, said outside flange and/or said inside flange further comprises an adhesive strip formed of a layer of adhesive or a double-sided adhesive tape and which is situated between a centripetal part of the flange and the face of the adjacent sheet of glass, so as to allow this flange to be fixed to the adjacent sheet of glass.

This adhesive strip allows the profiled beading to be fixed permanently to the glazed element after its position in relation to the glazed element has potentially been adjusted.

Said outside flange may comprise an upper end stop extending at right angles so as to allow said cover piece to be positioned and referenced.

In another alternative form, viewed in cross section, said outside face of said outside sheet of glass is free in relation to said groove and said inside face of said inside sheet of glass is free in relation to said groove and said interlayer flange has a thickness less than the thickness of said interlayer sheet of plastic. Said profiled beading therefore has neither an outside flange nor an inside flange.

In a very specific alternative form of the invention, or independently of the invention, said glazing comprises, along at least part of at least one edge, profiled beading comprising a groove for clip-fastening a cover piece onto said profiled beading, said cover piece comprising, when viewed in cross section, a barbed hook that enters said groove during the clip-fastening and said barbed hook comprises, viewed in cross section, a lip oriented toward the outside of said groove, said lip preferably being made in material different than that of said barbed hook.

Said barbed hook may comprise, viewed in cross section, a frontal end stop situated outside of said groove so as to limit the height over which the barbed hook enters the groove.

In a very specific alternative form of the invention, or independently of the invention, said glazing comprises, along at least part of at least one edge, profiled beading comprising a groove for clip-fastening a cover piece onto said profiled beading, said cover piece comprising, when viewed in cross section, a barbed hook that enters said groove during the clip-fastening and said groove comprises a bottom which forms an asymmetric U with a larger radius of curvature on one side:
- on a side close to a rebate when the groove is facing an edge face of a sheet of glass, or
- on a side distant from an outside face of the glazed element when the groove is situated above this outside face.

Thus, this part of the bottom with the larger radius of curvature makes it possible to decrease the space between the groove and the adjacent rebate and further increases the compactness of the clip-fastening system.

For preference, the profiled beading, which comprises the groove and the interlayer flange, as well as, potentially, an outside flange and/or an inside flange, is prefabricated: it is fabricated for example by extrusion through a die, independently of the manufacture of the glazed element (independently of the laminating) and is then fixed to the glazed element.

The cover piece is a component intended to be positioned further on the outside than the profiled beading.

Advantageously, the present invention makes it possible to propose a glazing with profiled clip-fastening beading which is reliable, while at the same time reducing the opaque area necessary to hide the fixing of this beading, which means to say making it possible to reduce the width of the cover piece and/or making it possible to reduce the width of a masking strip.

The present invention thus makes it possible to achieve a clip-fastening system that is compact while still being reliable.

With the present invention, along the edge of glazing equipped with the grooved profiled beading according to the invention, it is only a strip measuring 20 to 25 mm wide that cannot be used to allow light to pass through and which therefore reduces the field of view.

Several forms of embodiment of the present invention will be described hereinafter by way of nonlimiting example with reference to the attached drawing in which.

Figure 9:
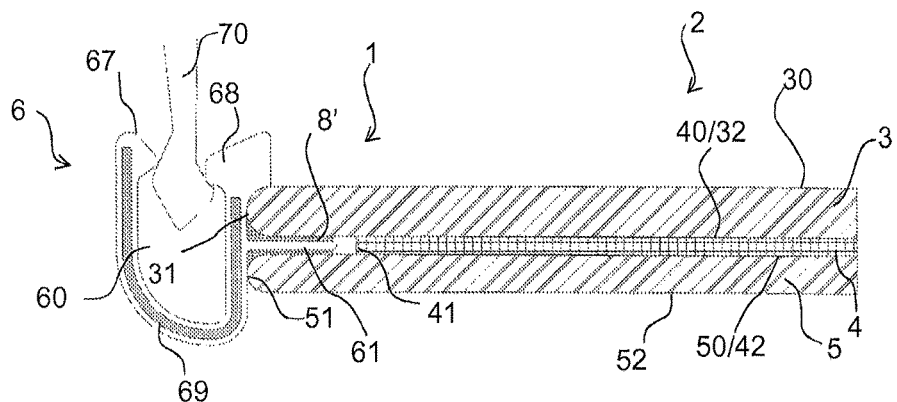
FIG. 9 is a view in section of an alternative form of the embodiment of FIG. 1, with a bonded interlayer flange, without a hinge portion and without an outside flange or an inside flange, this alternative form being illustrated without the bodywork rebate and with only the barbed hook of the cover piece.
Figure 12:
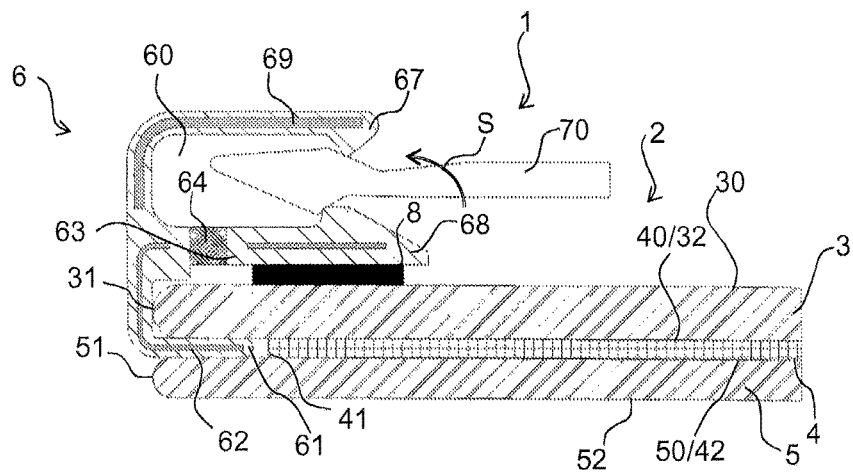
FIG. 12 is a view in section of a second embodiment of the assembly of a cover piece on beading profiled flashing according to the invention with a centripetal upper groove and an outside flange comprising a hinge portion, this embodiment being illustrated without the bodywork rebate and with only the barbed hook of the cover piece.
Figure 13:
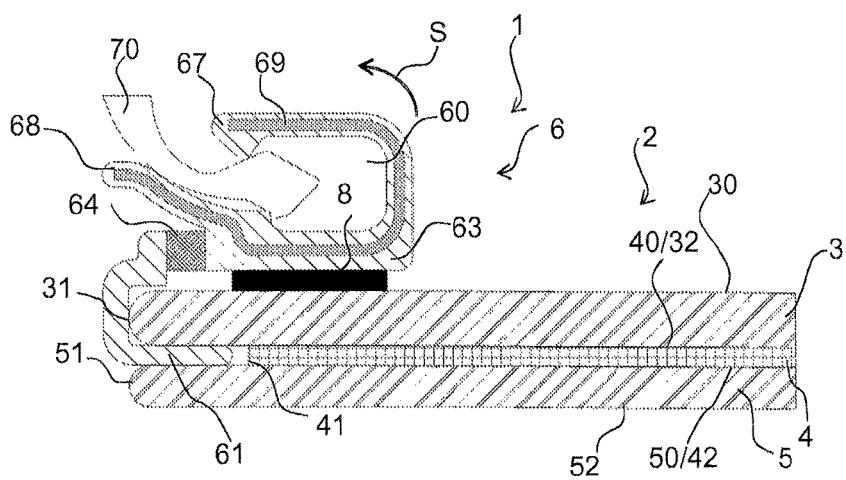
FIG. 13 is a view in section of an alternative form of the embodiment of FIG. 12, with a centrifugal upper groove.
Figure 15:
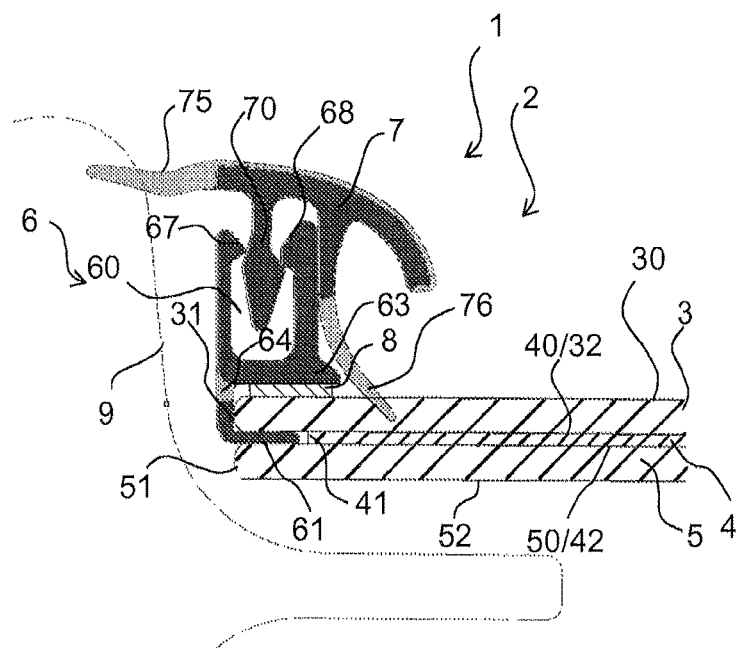
Figure 16:
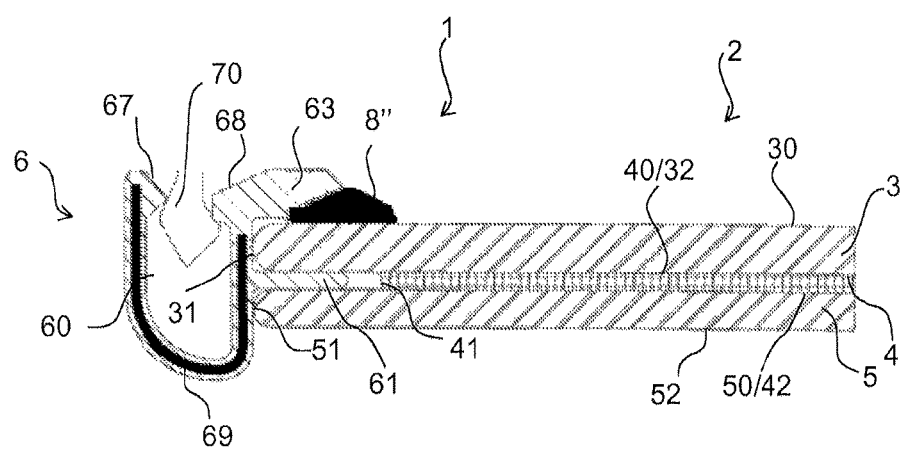

FIG. 15 is a view in section of an alternative form of FIGS. 12 and 13 which has an upper groove situated above the outside face of the outside sheet of glass and an outside flange comprising a hinge portion, this embodiment being illustrated with the bodywork rebate and with the complete cover piece; and FIG. 16 is a view in section of an alternative form of FIG. 9 because it is without the hinge portion, but has an outside flange bonded against the outside face of the outside sheet of glass.

Within each figure, the various elements are drawn to scale and the elements in the background are generally not depicted in order to make the figures easier to read. From one figure to another the same references denote the same elements.

Figure 1:
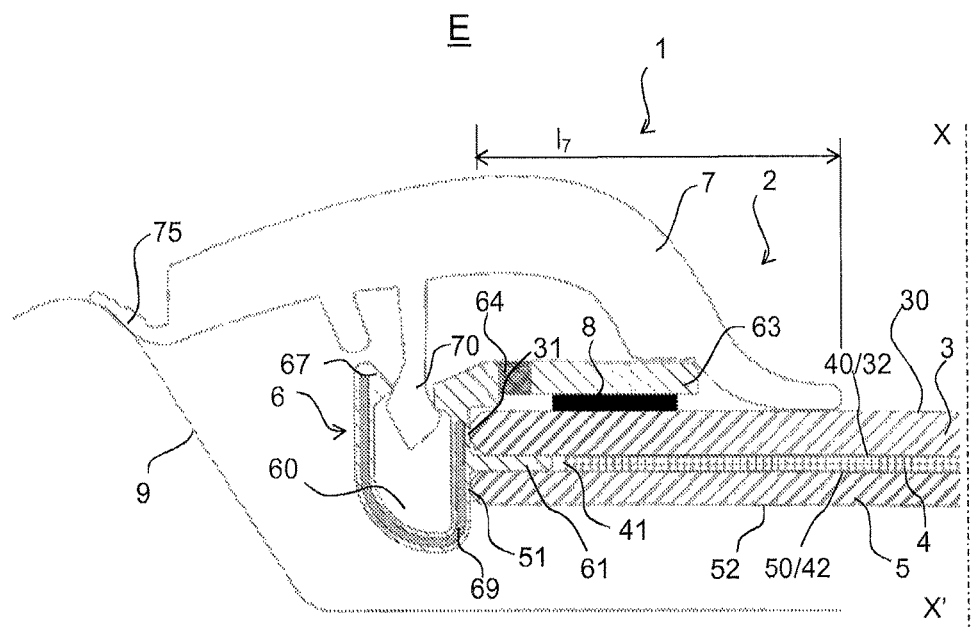
FIG. 1 is a view in section of a first embodiment of the assembly, near a bodywork rebate, of a cover piece on profiled beading according to the invention with a lateral groove and an outside flange comprising a hinge portion.

The present invention relates to a glazing 1, such as visible in part in FIG. 1, comprising a laminated glazed element 2 comprising an outside sheet of glass 3, an inside sheet of glass 5 and an interlayer sheet of plastic 4 situated between said two sheets of glass.

The present invention is described by way of example in the context of an application as vehicle glazing, this glazing achieving a separation between an outside space E which is outside the vehicle and an inside space I which is inside the vehicle. The ideas of "outside" and "inside" are therefore considered with respect to this outside space E and this inside space I respectively.

In the figures, the sheets of glass are each illustrated with a rounded edge face; however, these edge faces may be straight, with the corners between the edge faces and the faces then being right angles.

The present invention is described in particular in an application to a vehicle windshield and, more specifically, in the context of an application to a left-hand edge of a vehicle windshield, as visible in FIG. 1, FIG. 1 being a partial view in horizontal section of the glazing 1 installed in a bodywork opening.

In the context of this document, the idea of "centripetal" and that of "centrifugal" is to be considered with respect to the central longitudinal axis of forward travel of the vehicle equipped with the glazing according to the invention by way of windshield, which means to say the axis generally referred to as the axis X-X' of the vehicle, as can be seen in FIG. 1; the centrifugal direction is perpendicular to this axis and directed toward this axis whereas the centripetal direction is perpendicular to this axis and in the other direction, away from this axis.

The glazing 1 is intended to close an opening which in this instance is formed in vehicle bodywork; one edge of this opening—in this particular instance a left-hand lateral edge—is illustrated in FIG. 1 as a rebate 9.

The glazed element 9 of the glazing 1 is of necessity a laminated glazing which comprises, from the outside toward the inside, at least: the outside sheet of glass 3, the interlayer sheet of plastic 4 and the inside sheet of glass 5; however, it is possible for at least one other sheet to be interposed between the outside sheet of glass 3 and the interlayer sheet of plastic 4 or between the interlayer sheet of plastic 4 and the inside sheet of glass 5.

The outside sheet of glass 3 has an outside face 30 oriented toward the outside E, an interlayer face 32 oriented toward the interlayer sheet of plastic 4, and an edge face 31 situated between these two faces.

The inside sheet of glass 5 has an interlayer face 50 which is oriented toward the interlayer sheet of plastic 4, an inside face 52 which is oriented toward the inside I and an edge face 51 situated between these two faces.

The interlayer sheet of plastic 4 has an outside interlayer face 40 which is oriented toward the interlayer face 32 and which in this instance is in contact with this interlayer face 32, an inside interlayer face 42 which is oriented toward the interlayer face 50 and which in this instance is in contact with this interlayer face 50, and an edge face 41 situated between these two interlayer faces 32, 42.

The glazed element 2 thus has an outside face formed by the outside face 30 of the outside sheet of glass 3, an inside face formed by the inside face 52 of the inside sheet of glass 5, and an edge face situated between these two faces, corresponding to the edge face 31 of the outside sheet of glass 3 and to the edge face 51 of the inside sheet of glass 5, these two edge faces in this instance being in continuity with one another but separated by a space corresponding to the thickness of the sheet of plastic 4.

The glazing 1 is intended to be bonded to the rebate 9 using a bead of adhesive which has not been illustrated, situated between the inside face 52 of the inside sheet of glass and an adjacent part of the rebate 9.

The glazing 1 comprises, in addition to the glazed element 2, along at least part of at least one edge profiled beading 6 comprising a groove 60 for the clip-fastening of a cover piece 7 onto said profiled beading 6, said cover piece 7 comprising, when viewed in cross section, a barbed hook 70 entering said groove 60 at the time of clip-fastening.

The groove 60 has a mouth and a bottom: when clip-fastening the cover piece 7, the barbed hook 70 enters the groove 60 via the mouth and heads toward the bottom; in general, in the clip-fastened position, the barbed hook 70 does not touch the bottom of the groove.

The mouth of the groove, via which the barbed hook 70 is introduced, is formed by two throats: a centrifugal throat 67, situated to the left of the barbed hook 70 in FIG. 1 and a centripetal throat 68, situated to the right of the barbed hook 70 in this same figure. These two throats are there to guide the barbed hook 70 with precision toward the bottom of the groove 60 during the clip-fastening of the barbed hook 70.

The cover piece 7 is intended to be positioned further on the outside than the profiled beading 6 and to cover it at least in part when the glazing 1 is viewed from the outside E. In this instance, in the case of the application to a lateral edge of a windshield, this is a part intended to limit the ingress of water and to enhance the appearance of the sides of the glazing through the presence of a centripetal lip 75 situated against the rebate 9 and a centrifugal lip 76 situated against the outside face 30. This may be a trim element.

The profiled beading 6 comprises, viewed in cross section as in FIG. 1, an interlayer flange 61 which is situated between the interlayer face 32 of the outside sheet of glass 3 and the interlayer face 50 of the inside sheet of glass 5.

This interlayer flange 61 is in contact firstly with the interlayer face 32 of said outside sheet of glass 3 and secondly with the interlayer face 50 of the inside sheet of glass 5 and extends between these two faces.

Along the edge of the glazed element comprising the profiled beading 6, the edge face 41 of the interlayer sheet of plastic 4 is therefore set back centripetally with respect to the edge faces 31, 51 of the outside sheet of glass and of the inside sheet of glass respectively.

FIG. 1 illustrates a first embodiment of the invention in which the groove 60 is lateral: the groove 60 of the profiled beading extends along the left-hand edge of the glazed element, beside the edge face of the glazed element 2.

Furthermore, in this first embodiment, the mouth of the groove is oriented toward the outside.

In this first embodiment moreover the two throats are situated further toward the outside than the outside face of the outside glass; they are situated above this outside face 30 when the continuation of this face beyond the edge face 31 is considered.

The bottom of the groove 60 may be situated further toward the inside than the inside face 52; that does not hamper the positioning of the glazing in the bodywork opening because there is space between the inside face 52 and the rebate 9 for the bead of adhesive (not illustrated).

The two throats of the mouth of the groove are each in the form of hammers with their heads practically facing one another, the centrifugal throat 67 being situated slightly further toward the outside than the centripetal throat 68.

The barbed hook is a double hook: it is made up, when viewed in cross section, of two bosses oriented away from one another and offset, the centrifugal boss, which is intended to sit under the centrifugal throat 67, being situated slightly further out than the centripetal boss intended to sit under the centripetal throat 68.

Clip-fastening thus consists in causing the barbed hook 70 to enter the groove 60 and, more precisely, in causing the two bosses of the barbed hook to enter the groove 60 and sit under the two throats.

For correct retention, the width of the mouth, at the shortest between the two throats, is less than the width of the two bosses at the widest.

In FIG. 1, the interlayer flange 61 is a simple flange, made from the same material as and formed as an integral part of the groove 60, without a reinforcement.

As can be seen in this FIG. 1, the entirety of the outside face of the interlayer flange 61 is in contact with the interlayer face 32 of said outside sheet of glass 3 and the entirety of the inside face of the interlayer flange 61 is in contact with the interlayer face 50 of the inside sheet of glass 5.

The interlayer flange 61 thus occupies the space situated starting from flush under the edge face 31 of the outside sheet of glass and above the edge face 52 of the inside sheet of glass and heading toward the interlayer sheet of plastic 4; the interlayer flange thus has a thickness identical to the thickness of the interlayer sheet of plastic 4 (in this particular instance a thickness of 0.76 mm). However, it does not come into contact with the interlayer sheet of plastic 4 so that it does not disrupt the cohesion achieved by this interlayer sheet of plastic 4 and the two sheets of glass, that is to say so that it does not disrupt the laminating.

Figure 2:
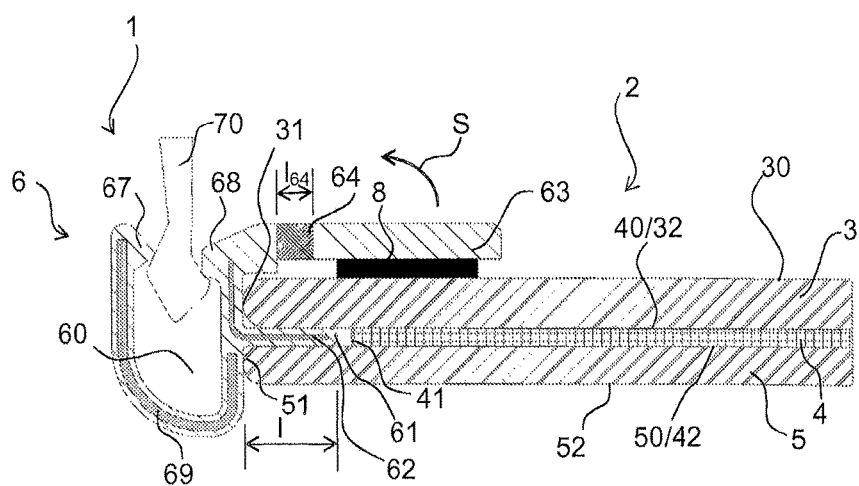
FIG. 2 is a view in section of an alternative form of the embodiment of FIG. 1, with a flat tenon, this alternative form being illustrated without the bodywork rebate and with only the barbed hook of the cover piece.

The interlayer flange 61 has a width 1, illustrated in FIG. 2, comprised between 2.0 and 6.0 mm, or even comprised between 3.0 and 5.0 mm. This width is enough to provide a firm holding of the interlayer flange between the outside sheet of glass and the inside sheet of glass without risking disrupting the cohesion of the interlayer sheet of plastic 4 and the two sheets of glass.

The glazed element 2 is fabricated before the profiled beading 6 is attached to the glazed element 2, namely the laminating of the sheets of glass 3, 5 with the sheet of plastic to form a laminated glazing is performed before the profiled beading 6 is attached to the glazed element 2.

In order to attach the profiled beading 6 to the glazed element 2 it is necessary:
to insert the interlayer flange 61 into the space between the interlayer face 32 of the outside sheet of glass and the interlayer face 50 of the inside sheet of glass, then to cause the profiled beading to adhere to the glazed element 2.

This adhesion may be achieved using an adhesive strip formed of a layer of adhesive or an adhesive tape, and notably a double-sided adhesive tape.

The profiled beading 6 comprises, viewed in cross section, an outside flange 63 situated above the outside face 30 of the outside sheet of glass 3; the outside flange 63 is thus further toward the outside than the outside face 30.

An adhesive strip 8 formed by a layer of adhesive or a double-sided adhesive tape is situated between a centripetal part of the outside flange 63 and the outside face 30.

This adhesive strip allows this outside flange 63 to be fixed to the underlying outside face 30.

In FIG. 1, the groove 60 has a height of approximately 7.8 mm and a width of approximately 5.5 mm; the interlayer flange 61 has a width l of approximately 5.0 mm, the outside flange 63 has a width of approximately 12 mm and the adhesive strip 8 has a width of approximately 6 mm.

In FIG. 1 all that is required is for the cover piece 7 to protrude over the top of the outside face 30 over a width $l_7$ of approximately 25 mm measured from the edge face of the glazed element and it will simultaneously mask the outside flange 63, the interlayer flange 61 and the bead of adhesive (not illustrated) used to attach the glazing to the bodywork.

In order to be able to keep the outside flange 63 away from the outside face 30 when inserting the interlayer flange 61 into the space between the two sheets of glass, the outside flange 63 comprises a hinge portion 64 made of a flexible polymer material, preferably having a width $l_{64}$, visible in FIG. 2, of between 0.5 and 2.0 mm.

This hinge portion allows the outside flange 63 to be lifted up so that the adhesive strip 8 (in the case of a layer of adhesive) can be positioned or so that the adhesive strip 8 (in the case of a double-sided adhesive tape with a temporary protective film that can be peeled away) can be activated and allows the outside flange 63 to be secured to the underlying outside face 30. This lifting movement is illustrated by the arrow S in FIG. 2.

FIG. 2 also illustrates an alternative form independent of FIG. 1 whereby the interlayer flange 61 comprises a flat tenon 62, completely integrated into the interlayer flange 61 and which comes into contact neither with the interlayer face 32 of the outside sheet of glass 3 nor with the interlayer face 50 of the inside sheet of glass 5, so as to stiffen the interlayer flange 31.

This tenon is flat in the space situated between the interlayer face 32 and the interlayer face 50 but has an elbow plum with the edge face 31 of the outside sheet of glass 3 and continues into the material from which the groove 60 is made in that portion of this groove that is against this edge face 31, so as to stiffen the interlayer flange 61 still further.

Figure 3:
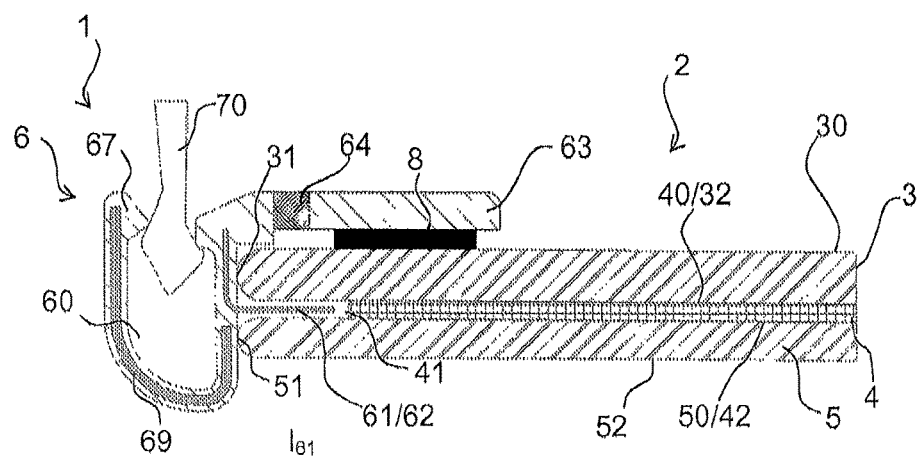
FIG. 3 is a view in section of an alternative form of the embodiment of FIG. 1, with a corrugated tenon, this alternative form being illustrated without the bodywork rebate and with only the barbed hook of the cover piece.
Figure 4:
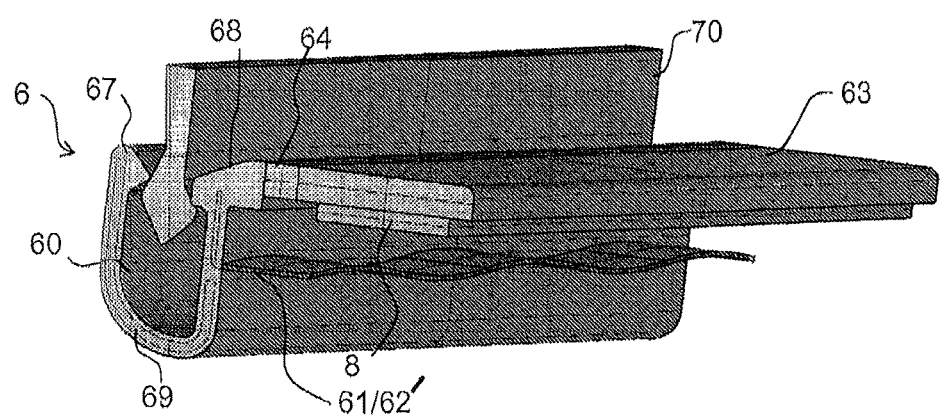
FIG. 4 is a perspective view of the alternative form of FIG. 3, illustrated without the glazed element.

In another alternative form, illustrated in FIGS. 3 and 4 and independent of that of FIGS. 1 and 2, the interlayer flange 61 is made of a corrugated tenon 62'. This corrugated tenon comes into contact, via the longitudinal corrugations thereof, with the interlayer face 32 of the outside sheet of glass 3 and with the interlayer face 50 of the inside sheet of glass 5, so as to hold the interlayer flange firmly between these two faces.

This corrugated tenon has an elbow plum with the edge face 31 of the outside sheet of glass 3 and extends into the material of which the groove 60 is made, toward the outside, in that portion of this groove that is against this edge face 31, so as to stiffen the interlayer flange 61.

Figure 5:
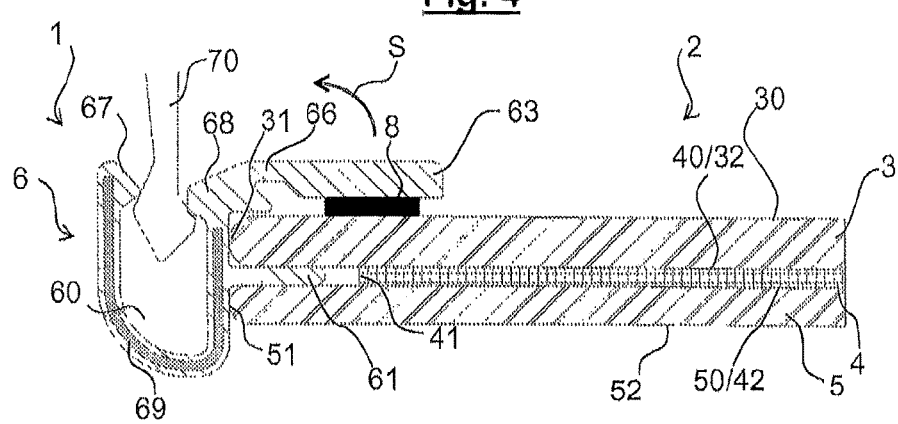
FIG. 5 is a view in section of an alternative form of the embodiment of FIG. 1, with an outside flange comprising a narrowing of section, this alternative form being illustrated without the bodywork rebate and with only the barbed hook of the cover piece.

FIG. 5 illustrates an alternative form independent of the preceding ones, in which the outside flange 63 comprises a narrowing of section 66, preferably having a thickness of the order of half the thickness of said outside flange 63. This narrowing of section 66 makes it possible, in place of the hinge portion 64, to raise the outside flange 63 with the raising movement illustrated by the arrow S.

The hinge portion 64, just like the narrowing of section 66, makes it possible to generate a region of elastic deformation where the groove 60 meets the outside flange 63.

Although this has not been illustrated, for this first alternative form, the profiled beading 6 could, when viewed in cross section, comprise an inside flange situated underneath (directly under, or indirectly under and with the interposition/insertion of a layer of adhesive or of an adhesive tape) the inside face 52 of said inside sheet of glass 5. In that case, this inside flange preferably comprises a hinge portion or a narrowing of section.

Figure 6:
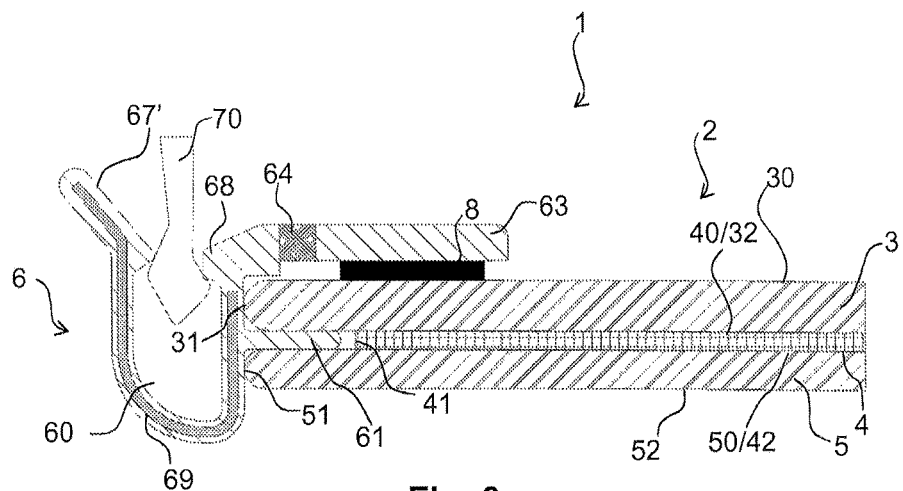
FIG. 6 is a view in section of an alternative form of the embodiment of FIG. 1, with an extended centrifugal throat, this alternative form being illustrated without the bodywork rebate and with only the barbed hook of the cover piece.

FIG. 6 illustrates an alternative form independent of the preceding ones, in which an elongate centrifugal throat 67', longer than the centrifugal throat 67 of the preceding alternative forms, provides guidance for the barbed hook 70 toward the mouth of the groove 60.

In the alternative forms illustrated in FIGS. 1 to 11, the groove 60 is situated facing the edge face 31 of said outside sheet of glass 3 and facing the edge face 51 of said inside sheet of glass 5.

In the alternative forms illustrated in FIGS. 1 to 6, the profiled beading 6 is situated against the edge face 31 of said outside sheet of glass 3.

In these alternative forms, the profiled beading 6 is situated against the edge face 51 of said inside sheet of glass 5.

Figure 7:
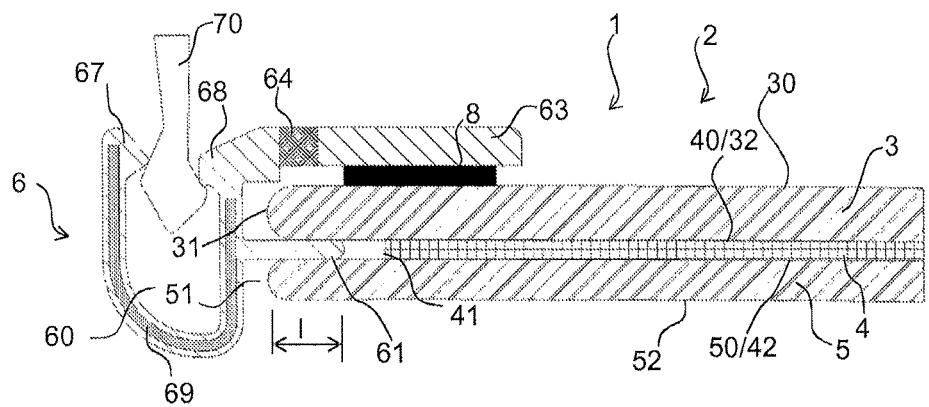
FIG. 7 is a view in section of an alternative form of the embodiment of FIG. 1, with a lateral groove spaced away from the edge face of the glazed element, this alternative form being illustrated without the bodywork rebate and with only the barbed hook of the cover piece.

However, it is possible for the profiled beading 6 not to be situated against the edge face 31 of the outside sheet of glass 3 and/or not to be situated against the edge face 51 of the sheet of said inside sheet of glass 5, as visible in FIG. 7.

In this alternative form, the groove 60 thus exhibits flexibility with respect to the glazed element 2 and, more specifically, with respect to the interlayer flange 61:
the absence of contact with the edge face 31 allows the groove to rotate with respect to the interlayer flange and toward this edge face during clip-fastening, and
the absence of contact with the edge face 51 allows the groove to rotate with respect to the interlayer flange and toward this edge face during clip-fastening.

Figure 8:
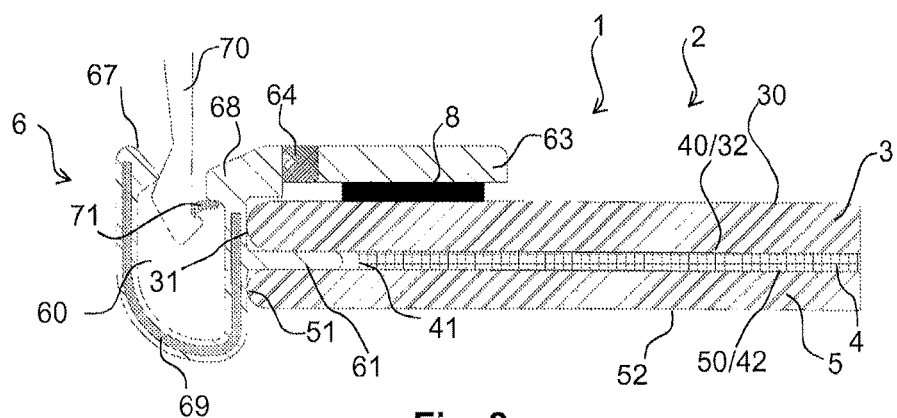
FIG. 8 is a view in section of an alternative form of the embodiment of FIG. 1, with a barbed hook comprising a lip, this alternative form being illustrated without the bodywork rebate and with only the barbed hook of the cover piece.

FIG. 8 illustrates an alternative form independent of the preceding ones, in which the barbed hook 70 comprises, viewed in cross section, in the part thereof that lies inside the groove 60, a lip 71 oriented toward the outside of said groove 60. This lip 71 is situated above the centripetal boss of the barbed hook and during clip-fastening becomes lodged under the centripetal throat 68.

This lip 71 may be made from a different material from that of the barbed hook 70 and notably from a softer material.

This lip makes it possible to reduce the effort required for clip-fastening when introducing the barbed hook 70 into the groove 60 while at the same time increasing the effort required for unclip-fastening.

FIG. 9 illustrates an alternative form independent of the preceding ones in which, viewed in cross section, the outside face 30 of the outside sheet of glass 3 is free in relation to the groove 60: the profiled beading has no outside flange.

Furthermore, the inside face 52 of the inside sheet of glass 5 is free in relation to the groove 60: the profiled beading has no inside flange.

Moreover, in this alternative form, the groove 60 is the same as in FIGS. 5 to 8, but the interlayer flange 61 is different: it has a thickness less than the thickness between the outside sheet of glass and the inside sheet of glass, namely less than the thickness of the interlayer sheet of plastic 4.

In this alternative form, the interlayer flange 61 is not in direct contact with the interlayer face 32 of the outside sheet of glass and is not in direct contact with the interlayer face 50 of the inside sheet of glass: an adhesive substance 8', such as a bead of adhesive, is situated between the interlayer flange and the interlayer face 32 of the outside sheet of glass and between the interlayer flange and the interlayer face 50 of the inside sheet of glass.

The interlayer flange 61 is thus in indirect contact with the interlayer face 32 of the outside sheet of glass and is in indirect contact with the interlayer face 50 of the inside sheet of glass.

Thus, the interlayer flange 61 is bonded to the sheets of glass; although this has not been illustrated, it could also be bonded to the edge face 41 of the interlayer sheet of plastic 4.

It is moreover possible for the interlayer flange to be in direct contact with one interlayer face 32, 52 and to be in indirect contact, via the adhesive substance, with the other interlayer face (52 or 32 respectively).

Figure 10:
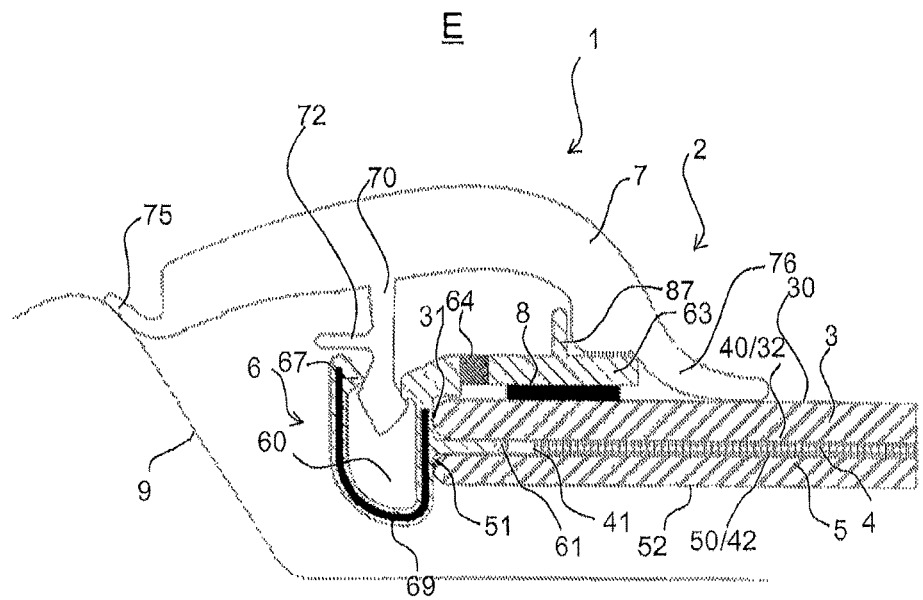
FIG. 10 is a view in section of an alternative form of the embodiment of FIG. 1, with a barbed hook comprising a frontal end stop and with an outside flange comprising an upper end stop.

FIG. 10 illustrates an alternative form independent of the preceding ones, in which the barbed hook 70 comprises, viewed in cross section, a frontal end stop 72 situated outside of said groove 60.

This frontal end stop 72 is centrifugal in this instance and lies against the centrifugal throat 67 at the time of clip-fastening, but could be centripetal and lie against the centripetal throat 68 at the time of clip-fastening; its purpose is to limit the extent to which the barbed hook 70 penetrates the inside of the groove 60.

FIG. 10 also shows that the outside flange 63 may comprise an upper end stop 87 extending at right angles to position and reference the cover piece 7.

For preference, as visible in FIGS. 1 to 11, the bottom of the groove 60 does not form a symmetric U but an asymmetric U, with a larger radius of curvature on the side of the rebate 9, thereby making it possible to reduce the bulk of the groove facing the adjacent rebate.

More specifically, the use of a groove with an asymmetric bottom having a larger radius of curvature on the side of the rebate makes it possible to increase the angle of inclination of the rebate in its part adjacent to the edge face of the glazed element by an angle α of the order of 20° and therefore reduce the distance d between the rebate 9 and the centrifugal bottom of the groove, from a value of around 9 mm to a smaller value of around 4.5 mm. That represents a significant space saving and thus makes it possible to make the clip-fastening system more compact and increase the size of the glazing.

FIG. 12 illustrates a second embodiment of the invention whereby the groove is no longer a lateral groove but an upper groove: the groove 60 of the profiled beading is no longer situated next to the edge face of the glazed element 2, as it was in the first embodiment and FIGS. 1 to 11, but is situated above the outside face 30 of the outside sheet of glass 3, namely above the outside face of the glazed element 2.

Of course, like in the first embodiment, in this second embodiment, the profiled beading 6 comprises an interlayer flange 61 which is situated between the interlayer face 32 of the outside sheet of glass 3 and said interlayer face 50 of said inside sheet of glass 5.

This interlayer flange 61 is in contact firstly with the interlayer face 32 of said outside sheet of glass 3 and secondly with the interlayer face 50 of the inside sheet of glass 5.

Thus, the groove 60 is formed as an integral part with an outside flange 63; the outside flange 63 bears the groove 60 the mouth of which may be centripetal, as visible in FIG. 12, or centrifugal, as visible in FIG. 13.

In order to be able to keep the outside flange 63 away from the outside face 30 when inserting the interlayer flange 61 into the space between the two sheets of glass, the outside flange 63 comprises a hinge portion 64 made of a flexible polymer material, preferably having a width $l_{64}$, as visible in FIG. 2, of between 0.5 and 2.0 mm.

This hinge portion allows the outside flange 63 to be lifted up so that the adhesive strip 8 (in the case of a layer of adhesive) can be positioned or so that the adhesive strip 8 (in the case of a double-sided adhesive tape with a temporary protective film that can be peeled away) can be activated and allows the outside flange 63 to be secured to the underlying outside face 30. This lifting movement is illustrated by the arrow S in FIGS. 12 and 13.

In FIG. 12, the profiled beading 6 has, in cross section, the shape of an m rotated through 90° (which means to say not horizontal, but vertical with respect to the outside and inside faces of the glazed element). A first cavity of the m forms the groove 60 to accommodate the barbed hook 70 of the cover piece 7 and a second cavity of the m straddles the outside sheet of glass 3, preferably sitting against the edge face 31 of the outside sheet of glass 3.

In FIG. 13, the profiled beading 6 has, in cross section, the shape of an inverted S as seen in a vertical mirror (namely with the top loop open not to the right but to the left and the bottom loop therefore open to the right). A first cavity of the inverted S, with the top cavity open to the left, forms the groove 60 to accommodate the barbed hook 70 of the cover piece 7 and a second cavity of the S straddles the outside sheet of glass 3, preferably sitting against the edge face 31 of the outside sheet of glass 3.

In FIGS. 12 and 13, the interlayer flange 61 is a simple flange, similar to that of FIG. 1, with no reinforcement. It does not come into contact with the interlayer sheet of plastic 4.

This interlayer flange 61 of the second embodiment may comprise a flat tenon, as illustrated in FIG. 2, to reinforce it, or may comprise a corrugated tenon, as illustrated in FIGS. 3 and 4.

In this second embodiment, it is moreover possible for the outside flange 63 to comprise a narrowing of section 66, as illustrated in FIG. 5.

Although this has not been illustrated, for this second embodiment, the profiled beading 6 may, viewed in cross section, have an inside flange situated under (directly under or indirectly under with the interposition/insertion of a layer of adhesive or an adhesive tape) the inside face 52 of said inside sheet of glass 5. In that case, this inside flange preferably comprises a hinge portion or a narrowing of section.

In this second embodiment, it is possible for the groove 60 to comprise an extended upper throat, similar to the extended centrifugal throat of FIG. 6.

In this second embodiment, it is possible for the profiled beading 6 to be spaced away from the edge face of the glazed element, as illustrated in FIG. 7, with the profiled beading 6 not being in contact with the edge face 31 of said outside sheet of glass 3 and/or with the edge face 51 of said inside sheet of glass 5, in order to give the profiled beading 6 greater flexibility.

In this second embodiment, alternatively or in combination:
the barbed hook 70 may comprise a lip 71 as illustrated in FIG. 8;
the interlayer flange 61 may be bonded, as illustrated in FIG. 9;
the barbed hook 70 may comprise a frontal end stop 72 and/or the inside flange 65 may comprise an end stop similar to the upper end stop 87 illustrated in FIG. 10;
although this has not been illustrated, the bottom of the groove 60 may form not a symmetric U but an asymmetric U, with a larger radius of curvature on the opposite side to the outside face 30, making it possible to reduce the bulk of the groove in relation to the cover piece.

Figure 14:
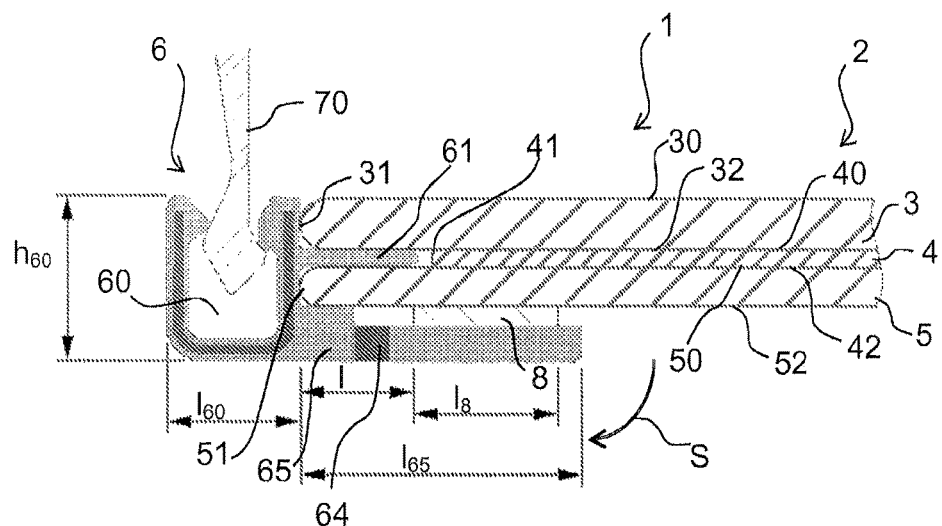
FIG. 14 is a view in section of a third embodiment of the assembly of a cover piece on a profiled beading according to the invention with a lateral groove, without an outside flange and with an inside flange comprising a hinge portion.

FIG. 14 illustrates a third embodiment of the invention whereby the groove is lateral but does not extend beyond an artificial plane considered to lie in the continuity of the outside surface 30 of the outside sheet of glass 30: the profiled beading lies flush with the continuity of the outside surface 30 of the outside sheet of glass 30; it is flush.

In this third embodiment of the invention, the profiled beading does not extend outside beyond the outside face 30 of the outside sheet of glass 3.

In this third alternative form, it is thus possible for the cover piece to be present over the groove 60 but not to protrude in the centripetal direction beyond the edge face 31 above the outside face 30, or even not to protrude in the centripetal direction beyond the centripetal throat 67.

It is possible for the centripetal throat 67 to be situated at a shorter distance toward the outside than the centrifugal throat 68, so that when the cover piece 7 is clipped into the groove 60, an outside face of the cover piece 7 lies in the continuity of the outside surface 30 of the outside sheet of glass 3; the cover piece is then flush with the outside sheet of glass 30.

Of course, as in the first embodiment, in this third embodiment, the profiled beading 6 comprises an interlayer flange 61 which is situated between the interlayer face 32 of the outside sheet of glass 3 and the interlayer face 50 of said inside sheet of glass 5.

This interlayer flange 61 is in contact firstly with the interlayer face 32 of said outside sheet of glass 3 and secondly with the interlayer face 50 of the inside sheet of glass 5.

The interlayer flange 61 has a width 1, comprised between 2.0 and 6.0 mm, or even comprised between 3.0 and 5.0 mm. This width is enough to allow firm retention of the interlayer flange between the outside sheet of glass and the inside sheet of glass without the risk of disrupting the cohesion of the interlayer sheet of plastic 4.

The profiled beading 6 has, viewed in cross section, an inside flange 65 situated under the inside face 52 of the inside sheet of glass 5; the inside flange 65 is thus further toward the inside than the inside face 52.

An adhesive strip 8 formed by a layer of adhesive or a double-sided adhesive tape is situated between a centripetal part of the inside flange 65 and the inside face 52.

This adhesive strip allows this inside flange 65 to be fixed to the inside face 52 on top of it.

In order to be able to keep the inside flange 65 away from the inside face 52 when inserting the interlayer flange 61 into the space between the two sheets of glass, the inside flange 65 comprises a hinge portion 64 made of a flexible polymer material.

This hinge portion allows the inside flange 65 to be lifted up so that the adhesive strip 8 (in the case of a layer of adhesive) can be positioned or so that the adhesive strip 8 (in the case of a double-sided adhesive tape with a temporary protective film that can be peeled away) can be activated and allows the inside flange 65 to be secured to the inside face 52 lying above it. This lifting movement is illustrated by the arrow S in FIG. 14.

In FIG. 14, the interlayer flange 61 is a simple flange similar to that of FIG. 1, without a reinforcement. It does not come into contact with the interlayer sheet of plastic 4.

This interlayer flange 61 of the third embodiment may comprise a flat tenon, as illustrated in FIG. 2, to reinforce it, or may comprise a corrugated tenon, as illustrated in FIGS. 3 and 4.

In this third embodiment, it is moreover possible for the inside flange 65 to comprise a narrowing of section 66, as illustrated in FIG. 5; a narrowing of section, just like a hinge portion, makes it possible to generate a region of elastic deformation where the groove 60 meets the inside flange 65.

In this third embodiment, it is possible for the groove 60 to comprise an elongate centrifugal throat similar to the elongate centrifugal throat of FIG. 6.

In this third embodiment, it is possible for the profiled beading 6 to be spaced away from the edge face of the glazed element, as illustrated in FIG. 7, with the profiled beading 6 not in contact with the edge face 31 of said outside sheet of glass 3 and/or with the edge face 51 of said inside sheet of glass 5, in order to make the profiled beading 6 more flexible.

Figure 11:
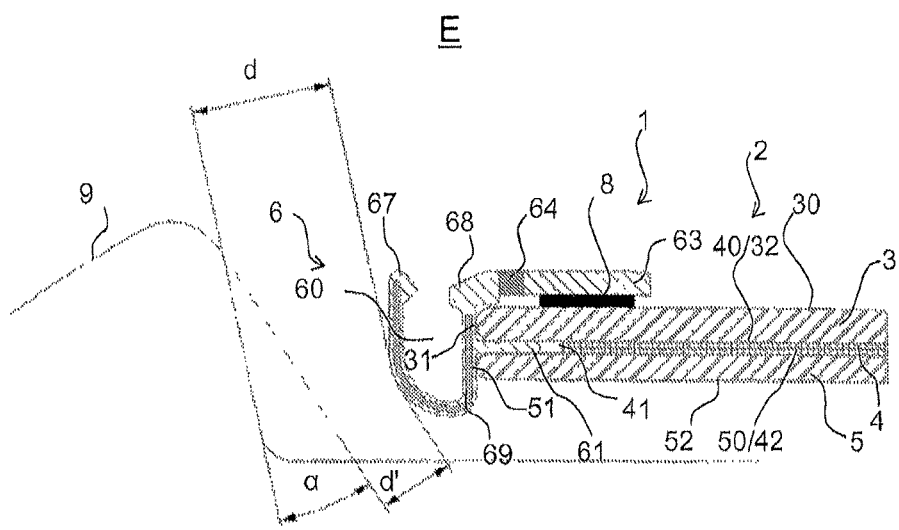
FIG. 11 is a view in section similar to that of FIG. 1, without the cover piece, illustrating a corner at the bottom of the rebate with a radius of curvature that is greater on the side of the rebate and the corresponding reduction in distance.

In this third embodiment, alternatively or in combination:
the barbed hook 70 may comprise a lip 71, as illustrated in FIG. 8;
the interlayer flange 61 may be bonded, as illustrated in FIG. 9;
the barbed hook 70 may comprise a frontal end stop 72 and/or the inside flange 65 may comprise an end stop similar to the upper end stop 87 illustrated in FIG. 10;
although this is not visible in FIG. 14, the bottom of the groove 60 may form not a symmetric U but an asymmetric U, with a larger radius of curvature on the rebate side, thus making it possible to reduce the bulk of the groove in relation to the adjacent rebate, as illustrated in FIG. 11, with the advantages described in respect of that figure.

In FIG. 14, the groove 60 has a height $h_{60}$ of approximately 6.8 mm and a width $l_{60}$ of approximately 5.5 mm; the interlayer flange 61 has a width l of 5.0 mm, the inside flange 65 has a width $l_{65}$ of around 12 mm and the adhesive strip 8 has a width $l_8$ of around 6 mm.

In this figure, a masking strip (not illustrated) situated further toward the outside than the interlayer flange and of a width of 20 mm starting from the edge face of the glazed element will be enough to mask both the interlayer flange and the bead of adhesive (not illustrated) used to fix the glazing to the bodywork.

FIG. 15 illustrates the possibility of creating a profiled beading 6 with an upper groove 60 which is situated on the outside flange 63 which is itself bonded to the outside face 30 of the outside sheet of glass 3 using the adhesive strip 8.

As in FIG. 10, the cover piece 7 is a trim element comprising a centripetal lip 75 extending against the rebate 9 and a centrifugal lip 76 extending against the outside face 30 (these two lips are illustrated in a virtual situation corresponding to the shape of the profiled beading 6 according to this alternative form when the beading is observed on its own, without the glazed element and without the rebate).

In this FIG. 15 moreover, the dark gray illustrates the use of a rigid plastic such as polypropylene and the light gray illustrates the use of a flexible plastic such as TPE; the two lips and the hinge portion 64 situated facing the corner made by the outside face 30 and the edge face 31 of the outside sheet of glass 3 are each made of soft plastic.

FIG. 16 illustrates one option for creating a profiled beading 6 with a lateral groove 60 and an outside flange 63 with no hinge portion. For that, the outside flange 63 is bonded against the outside face 30 of the outside sheet of glass 3 using an outside bead of adhesive 8" which at least partially penetrates between, on the one hand, a centripetal part of the outside flange which is thinner in relation to the rest of the outside flange and, on the other hand, the outside face 30. This outside bead of adhesive 8" is applied after the profiled beading 6 has been positioned in relation to the edge face of the glazed element (this positioning step comprising the introduction of the interlayer flange 41 between the outside sheet of glass and the inside sheet of glass).

Although this has not been depicted, in an alternative form of the first embodiment or of the third embodiment, the outside face 30 of the outside sheet of glass 3 may be free in relation to the groove 60 and the inside face 52 of the inside sheet of glass 5 may be free in relation to the groove 60; in that case, the profiled beading 6 has neither an outside flange nor an inside flange. In order for the interlayer flange 61 to hold the profiled beading correctly in position, it therefore has a thickness less than the thickness of the interlayer sheet of plastic 4 and is bonded between the interlayer face 32 and the interlayer face 50 just as in FIG. 9.

Whatever the embodiment, the material of which the groove 60 is made may be reinforced by the presence, on the inside, of an insert 69, such as a metallic insert for example, that increases the rigidity of the groove. This insert may, for example, be an aluminum profile 0.4 mm in thickness.

The present invention can be applied to any glazing and, in particular, to any vehicle glazing. It may be applied to any edge of this glazing, left, right, top or bottom and, in particular, to several of these edges simultaneously, or even to all of these edges simultaneously. It may be applied in particular to the clip-fastening, at the bottom of a vehicle windshield, of a plastic cover piece sometimes referred to as the "scuttle panel" or "cowl".

The profiled beading 6 may be situated along two lateral edges of the glazed element 2 and/or along a top edge of the glazed element. It is possible for it not to be situated along a bottom edge, particularly when the glazing is a vehicle windshield and the glazing comprises another type of profiled beading along this bottom edge.

The invention claimed is:
1. A glazing, comprising a laminated glazed element comprising an outside sheet of glass, an inside sheet of glass and an interlayer sheet of plastic situated between said outside and inside sheets of glass,
said outside sheet of glass having an outside face, a first edge face and a first interlayer face which is oriented toward said interlayer sheet of plastic,
said inside sheet of glass having a second interlayer face which is oriented toward said interlayer sheet of plastic, a second edge face and an inside face,
said glazing comprising along at least part of at least one edge a profiled beading comprising a groove for clip-fastening a cover piece onto said profiled beading, said cover piece comprising, viewed in cross section, a barbed hook that enters said groove at the time of clip-fastening,
wherein said interlayer sheet of plastic includes a third edge face that is set back centripetally with respect to both the first edge face and the second edge face so that, when said glazing is viewed in cross-section, a region, in which said interlayer sheet of plastic is absent, is formed between said first interlayer face of said outside sheet of glass and said second interlayer face of said inside sheet of glass and between the third edge face and at least one of the first and the second edge face,
wherein said profiled beading comprises, when viewed in cross section, an interlayer flange situated in said region between said first interlayer face of said outside sheet of glass and said second interlayer face of said inside sheet of glass, and wherein the interlayer flange does not contact the third edge face.

2. The glazing as claimed in claim 1, wherein said interlayer flange has a width comprised between 2.0 and 10.0 mm.

3. The glazing as claimed in claim 2, wherein the width of said interlayer flange is comprised between 2.0 and 6.0 mm.

4. The glazing as claimed in claim 3, wherein the width of said interlayer flange is comprised between 3.0 and 5.0 mm.

5. The glazing as claimed in claim 1, wherein said interlayer flange is formed as an integral part of said beading.

6. The glazing as claimed in claim 5, wherein said interlayer flange comprises a flat tenon that comes into contact neither with said interlayer face of said outside sheet of glass nor with said interlayer face of said inside sheet of glass.

7. The glazing as claimed in claim 1, wherein said interlayer flange is made of a corrugated tenon.

8. The glazing as claimed in claim 7, wherein said corrugated tenon extends into the material of which said groove is made.

9. The glazing as claimed in claim 1, wherein said profiled beading is situated against said first edge face of said outside sheet of glass.

10. The glazing as claimed in claim 1, wherein said profiled beading is situated against said second edge face of said inside sheet of glass.

11. The glazing as claimed in claim 1, wherein said profiled beading is situated along two lateral edges of said glazed element and/or along an upper edge of said glazed element.

12. The glazing as claimed in claim 1, wherein said interlayer flange has a thickness equal to a distance between said outside sheet of glass and said inside sheet of glass.

13. The glazing as claimed in claim 12, wherein said interlayer flange has a thickness equal to a thickness of said interlayer sheet of plastic.

14. The glazing as claimed in claim 13, wherein said interlayer flange has a thickness equal to 0.76 mm.

15. The glazing as claimed in claim 1, wherein said interlayer flange has a thickness less than a distance between said outside sheet of glass and said inside sheet of glass.

16. The glazing as claimed in claim 1, wherein said groove is situated facing the first edge face of said outside sheet of glass and/or facing the second edge face of said inside sheet of glass.

17. The glazing as claimed in claim 1, wherein said groove is situated above said outside face of said outside sheet of glass.

18. The glazing as claimed in claim 17, wherein said profiled beading has, in cross section, the shape of an m rotated through 90°, with a first cavity of the m to accommodate the barbed hook of said cover piece and a second cavity of the in to straddle said outside sheet of glass.

19. The glazing as claimed in claim 1, wherein said profiled beading comprises, when viewed in cross section, an outside flange situated above said outside face of said outside sheet of glass.

20. The glazing as claimed in claim 19, wherein said outside flange and/or said inside flange comprises a hinge portion made of a flexible polymer material.

21. The glazing as claimed in claim 20, wherein the hinge portion has a width comprised between 0.5 and 2.0 mm.

22. The glazing as claimed in claim 19, wherein said outside flange and/or said inside flange comprises a narrowing of section.

23. The glazing as claimed in claim 22, wherein said narrowing of section has a thickness that is half the thickness of said outside flange and/or of said inside flange which bears it.

24. The glazing as claimed in claim 19, wherein said outside flange comprises an upper end stop extending at right angles.

25. The glazing as claimed in claim 1, wherein said profiled beading comprises, when viewed in cross section, an inside flange situated below said inside face of said inside sheet of glass.

26. The glazing as claimed in claim 1, wherein, viewed in cross section, said outside face of said outside sheet of glass is free in relation to said groove and said inside face of said inside sheet of glass is free in relation to said groove.

27. The glazing as claimed in claim 1, wherein said barbed hook comprises, viewed in cross section, a lip oriented toward the outside of said groove.

28. The glazing as claimed in claim 27, wherein said lip is made in material different than that of said barbed hook.

29. The glazing as claimed in claim 1, wherein said barbed hook comprises, viewed in cross section, a frontal end stop situated outside of said groove.

30. The glazing as claimed in claim 1, wherein said groove comprises a bottom which forms an asymmetric U with a larger radius of curvature on one side.

31. The glazing as claimed in claim 1, wherein the glazing is a vehicle glazing.

* * * * *